(12) United States Patent
Lin

(10) Patent No.: US 6,256,743 B1
(45) Date of Patent: Jul. 3, 2001

(54) SELECTIVE POWER-DOWN FOR HIGH PERFORMANCE CPU/SYSTEM

(75) Inventor: Chong Ming Lin, Sunnyvale, CA (US)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/069,335

(22) Filed: Apr. 29, 1998

Related U.S. Application Data

(63) Continuation of application No. 08/811,238, filed on Mar. 3, 1997, now Pat. No. 5,787,297, which is a continuation of application No. 08/487,976, filed on Jun. 7, 1995, now Pat. No. 5,655,124, which is a continuation of application No. 07/860,717, filed on Mar. 31, 1992, now Pat. No. 5,452,401.

(51) Int. Cl.$^7$ .................................................. G06F 1/00

(52) U.S. Cl. ...................... 713/322; 713/310; 713/321; 713/324

(58) Field of Search ................................. 713/310, 321, 713/322, 324

(56) References Cited

U.S. PATENT DOCUMENTS

| | | |
|---|---|---|
| 3,922,526 | 11/1975 | Cochran . |
| 4,317,180 | 2/1982 | Lies . |
| 4,670,837 | 6/1987 | Sheets . |

(List continued on next page.)

FOREIGN PATENT DOCUMENTS

| | | |
|---|---|---|
| 40 40 382 A1 | 7/1991 | (DE) . |
| 0284364 | 9/1988 | (EP) . |
| 63-026716 | 2/1988 | (JP) . |
| 26 616 | 3/1990 | (JP) . |

OTHER PUBLICATIONS

Patent Abstracts of Japan, vol. 12, No. 235, Jul. 6, 1988, and JP63026716, Feb. 4, 1988.
Colwell et al., "A VLIW Architecture for a Trace Scheduling Compiler," *IEEE Transactions on Computers*, vol. 37, No. 8, Aug. 1988.
Towler et al., "A 128k 6.5ns Access/ 5ns Cycle SMOS ECL Static RAM,"*IEEE Intl. Solid–State Circuits Conf.*, pp. 30–31, plus Figure 1, Feb. 1989.
Patent Abstracts of Japan, vol. 14, No. 253, May 30, 1990, and JP2066616, Mar. 6, 1990.
"AMD Readies 486 Clone," *E.E. Times*, Jan. 13, 1992.
Dobberpuhl et al., "A 200MHZ 64b Dual–Issue CMOS Microprocessor," *IEEE Intl. Solid–State Circuits Conf.*, pp. 106–107, 1992.

*Primary Examiner*—Ayaz R. Sheikh
*Assistant Examiner*—Rupal D. Dharia
(74) *Attorney, Agent, or Firm*—Sterne, Kessler, Goldstein, & Fox, P.L.L.C.

(57) ABSTRACT

A microelectronic device according to the present invention is made up of two or more functional units, which are all disposed on a single chip, or die. The present invention works on the strategy that all of the functional units on the die are not, and do not need to be operational at a given time in the execution of a computer program that is controlling the microelectronic device. The present invention on a very rapid basis (typically a half clock cycle), therefore, turns on and off the functional units of the microelectronic device in accordance with the requirements of the program being executed. This power down can be achieved by one of three techniques; turning off clock inputs to the functional units, interrupting the supply of power to the functional units, or deactivating input signals to the functional units. The operation of the present invention results in a very significant reduction in power consumption and corresponding heat dissipation by the microelectronic device as compared to the conventional approach of keeping all functional units operational all of the time.

8 Claims, 6 Drawing Sheets

U.S. PATENT DOCUMENTS

| | | |
|---|---|---|
| 4,695,946 | 9/1987 | Andreasen et al. . |
| 4,698,748 | 10/1987 | Juzswik et al. . |
| 4,748,559 | 5/1988 | Smith et al. . |
| 4,766,566 | 8/1988 | Chuang . |
| 4,893,271 | 1/1990 | Davis et al. . |
| 4,954,951 | 9/1990 | Hyatt . |
| 5,113,523 | 5/1992 | Colley et al. . |
| 5,150,469 | 9/1992 | Jouppi . |
| 5,153,535 | 10/1992 | Fairbanks et al. . |
| 5,167,024 | 11/1992 | Smith et al. . |
| 5,218,704 * | 6/1993 | Watts, Jr. et al. ............... 713/322 |
| 5,239,652 * | 8/1993 | Siebert et al. .................. 713/323 |
| 5,265,256 | 11/1993 | Chau-Lee et al. . |
| 5,274,828 | 12/1993 | McAdams . |
| 5,361,272 * | 11/1994 | Gorelik ........................... 372/50 |
| 5,452,401 | 9/1995 | Lin . |
| 5,481,733 * | 1/1996 | Douglis et al. ................. 713/324 |
| 5,630,143 | 5/1997 | Maher et al. . |

\* cited by examiner

US 6,256,743 B1

SELECTIVE POWER-DOWN FOR HIGH PERFORMANCE CPU/SYSTEM

CROSS-REFERENCE TO RELATED APPLICATIONS

This application is a continuation of application Ser. No. 08/811,238, filed Mar. 3, 1997 U.S. Pat. No. 5,787,297, which is a continuation of application Ser. No. 08/487,976, filed Jun. 7, 1995 U.S. Pat. No. 5,655,124, which is a continuation of application Ser. No. 07/860,717, filed Mar. 31, 1992, U.S. Pat. No. 5,452,401.

The following are commonly owned, co-pending applications:

"Superscalar RISC Instruction Scheduling" application Ser. No. 08/219,425, (now U.S. Pat. No. 5,497,499) and "Hardware Emulation Accelerator and Method", application Ser. No. 08/352,680 (now U.S. Pat. No. 5,581,742).

The disclosures of the above applications are incorporated herein by reference.

BACKGROUND OF THE INVENTION

1. Field of the Invention

The present invention relates generally to systems and methods for reducing power dissipation requirements and power consumed by single microelectronic devices, and more particularly, to dynamic control of power consumption by and resultant power dissipation required of such microelectronic devices.

2. Related Art

Power dissipation requirements of microelectronic devices (also called semiconductor devices or semiconductor chips or integrated circuits) have become critical in their design, fabrication and use. This is particularly true with very large scale integrated (VLSI) devices and ultra large scale integrated (ULSI) devices, which typically today have over 1,000,000 transistors (active passive) on a single semiconductor die. The active devices are typically run (clocked) at very high speed (25 MHz and 33 MHz speeds are now typical, with much higher clock rates contemplated, for example, 250 MHz) in order to achieve desired system functionality and performance.

As is well known, the high clock rate and the high number of active devices, regardless of the fabrication technology that is used, produce significant power dissipation requirements when compared to the actual physical size of the die of the microelectronic device. For purposes of illustration, a typical die with 1,000,000 active devices is fabricated on a die 15 mm by 15 mm and requires greater than 132 pinouts. Such a microelectronic device can operate at a system clock speed of 30 MHz with 1 micrometer ($\mu$m) CMOS technology.

The die must be permanently housed in a suitable housing or package, which among other things (pin out, environmental, physical protection, etc.) must provide adequate heat dissipation in order to prevent failure of the device.

It is not uncommon for a single microelectronic device such as the example above to generate in the range of 5–10 watts of heat that must be dissipated during normal operation. As a result, the junction temperature of the die of such a microelectronic device can reach 100° C. for a ceramic package without heatsinking, at the high end of the commercial temperature range, 70° ambient. The 5–10 watt number will look small compared to the dissipation requirement for successive generations of more powerful microelectronic devices, which are projected by year 2000 to have 100 million active devices on a single die. Contemplated die sizes are 25 mm by 25 mm.

Various strategies for packaging have evolved to deal with large heat dissipation. All include some type of heat sink or thermal grease arrangement for rapidly drawing away the unwanted heat so as to protect the microelectronic device (die and bond wires) from physical failure and performance degradation. Gas, such as air, and even liquid, such as water, freon, and more efficient coolants are typically used in addition to a conventional heat sink. Heat sink approaches however, act to increase physical size, cost, mechanical complexity, and weight of the packaged microelectronic device. Moreover, the heat dissipation (i.e., thermal stress) requirements act to limit the physical size of a die that can be accommodated in a single package.

Representative of the heat dissipation requirements are conventional microcrocessor chips running at clock speeds up to 50 MHz, which can typically generate 5 watts of dissipated power in normal operation. In order to accommodate the heat dissipation requirement, special heat sinks arrangement are provided.

The constant trend in electronics is to reduce the size of microelectronic devices so that smaller and lighter electronic and computer products can be made. This miniaturization drive goes on unabated, and historically produces from year to year dramatic reductions in physical size.

The heat dissipation requirement, however, acts as a barrier to this miniaturization process of electronic and computer devices. In other words, the physics of having to dissipate the heat from the microelectronic device limits the physical size and weight reduction of the electronic or computer device that can be achieved. This affects the lifetime of microelectronic devices as well. For example, the reason why a solid state laser has a shorter lifetime than an LED is due to concentration of heat at a small area.

Another significant ongoing trend in electronics is the increase in the features and functions and the decrease in response time that can be provided by an electronic or computer device. This is achieved through more complex and powerful microelectronic devices. This is the result of the increased integration of active devices on a single die. However, additional active devices on the die results in increased heat dissipation requirements, which acts to limit the reduction in the size of the microelectronic device package that can be achieved. Even by reducing the power supply voltage, DEC's Alpha CMOS chip, for example, is reported to dissipate 30 watts at 200 Mhz.

The dramatic decrease in the physical size of microelectronic devices when compared to their computational capability, and features and functions that they can produce, has resulted in the creation of very small personal computers, typically called laptop, notebook and palmtop computers. This is the latest benchmark in an ongoing trend to reduce in size computers having powerful features and functions.

A typical portable computer today having a 386SX type microprocessor has physical dimensions of 12 in. by 16 in., and a weight of 15 lbs., of which 1 lb. is the rechargeable battery. A typical laptop computer today having a 386SXL type microprocessor has physical dimensions of 8 in. by 11 in. by 2 in. and a weight of 5–7 lbs., of which 0.5 lbs. is the rechargeable battery.

One of the most critical limiting factors, however, to such notebook (also laptop and palmtop) computers is the battery that is needed to run the machine. The battery must provide sufficient electrical power so that the computer can operate for a long enough period of time to satisfy user demand. Typical operating time for notebook computers today is in the range of 3 to 4 hours for a single battery charge.

The battery comprises one of the largest components of the computer system in terms of weight and physical size. However, it is critical for the user that enough electrical power be provided by the battery so that desired computer operation can occur over a sufficient period of time. However, this requirement for operability causes the total size of the computer system to increase since the battery physical size must be increased to meet these requirements.

Consequently, considerable research and development is being directed towards producing much more efficient batteries for a given size and weight. The goal here is to increase battery technology in charge capacity so that the resultant battery will provide more power and longer time for the given size and space. This will in turn act to reduce the size of the computer system that uses it.

In addition to reducing the size of the battery, considerable effort is being expended to try to increase the performance of the computer system in terms of power consumption. One conventional approach as utilized by Intel is to turn off unused peripheral chips. This occurs in the Intel 80386 chip set. By turning off unused peripheral chips, significant battery life can be achieved because the peripheral chips consumed considerable amounts of power.

A further approach implemented in AMD's AM386DXL microprocessor chip is to slow down the clock speed (e.g., from 40–0 MHz) to conserve power.

In view of the above, there is a great need for improvement in heat dissipation and power consumption by microelectronic devices, particularly used with computer systems, so as to reduce packaging complexity and size and to increase operability time of systems where batteries are used to electronically power the microelectronic devices.

SUMMARY OF THE INVENTION

A microelectronic device according to the present invention is made up of two or more functional units, which are all disposed on a single chip, or die. The present invention works on the strategy that all of the functional units on the die are not, and do not need to be operational at a given time in the execution of a computer program that is controlling the microelectronic device. The present invention on a very rapid basis (typically a half clock cycle), therefore, turns on and off the functional units of the microelectronic device in accordance with the requirements of the program being executed. The operation of the present invention results in a very significant reduction in power consumption and corresponding heat dissipation by the microelectronic device as compared to the conventional approach of keeping all functional units operational all of the time.

A representative example of the present invention described herein has achieved a reduction in power dissipation and power consumption of 30% as compared to the normal conventional approach of keeping all of the functional operational units active all of the time during the execution of the computer program. Depending on the architecture of the microelectronic device and the computer program that is being executed, reductions of 0% to 50% can be achieved. Where single scalar CPU would be on the lower side in comparison to a supersealar CPU architecture, because more blocks may remain idle more frequently.

If the functional units are divided into still smaller blocks, then a higher percentage of units/blocks can be turned off, given that the necessary control logic necessary to perform the switching does not add too much overhead.

The present invention utilizes several approaches for determining when to turn on and off the functional units of the microelectronic device. One approach utilizes the compiler which compiles the source code of the computer program into machine code used to control the operation of the microelectronic device. A logic unit evaluates (e.g., decodes or monitors) the machine code during execution, and based on utilization information provided by the compiler, determines at each step in the execution of the computer program which functional units are needed for execution, and therefore should be turned on or off. For example, a graphics unit may not need to run when non-graphic operations are executing. Similarly, floating point units (FPU) only run 20–30% of the time in a conventional workstation, thus, it does not need to be on during idle periods. Cache memory units also lend themselves to control based on the present invention.

Another approach used by the present invention for determining when to turn on and off the functional units is that performed using a logic unit on the die that evaluates (monitors) the execution and operation of the functional units. This monitoring function produces indications of upcoming operation (including execution and latency to complete the issued instruction) that can be used for controlling the turn on/turn off operation of the present invention. In a compact on-chip low cost FPU, for example, not all the units can be used at the same time or a collision can result. When an FALU operation is being executed, the multiplier or divider may not be pemitted to run. Power can therefore be shut off to these units.

Any suitable preselected amount of time can be used by the present invention for turning on and for turning off the functional units in accordance with the requirements of the computer program that is being executed. The turn on/turn off can be as fast as a half-clock cycle, if desired, so as to produce maximum power dissipation saving and power consumption reduction. Other clock cycle periods for turn on and for turn off can be used. Another method is turning on and off power line(s) to a selected block or blocks.

The present invention contemplates any appropriate electronic approach for turning on and off a functional unit. In complementary metal oxide semiconductor (CMOS) circuits, a preferred approach is either (1) to stop the clock signal to the functional unit that is being turned off, or (2) to stop the inputs of the functional unit being turned off from changing. Either approach produces the desired result of turning off the functional unit. The functional unit can be subsequently turned on by the opposite approach that is used for turning it off.

The present invention has particular applicability to CMOS circuitry because it takes full advantage of the CMOS characteristic that no power is consumed by a circuit unless there is a state change. By preventing state changes in the functional unites) not being used at that point in the execution of the computer program, the present invention can produce the desired power dissipation requirement reduction and power consumption reduction. Switching the power buses on/off is not necessary, and minimal chip area is required for control.

BRIEF DESCRIPTION OF THE DRAWINGS

The present invention is better understood with reference to the following drawings viewed in connection with the accompanying text.

DETAILED DESCRIPTION OF THE INVENTION

The present invention is a system and method for selectively controlling the power provided to each of the functional units of a microelectronic device so that the functional units can be turned on and off as needed by the execution of the computer program that is controlling the microelectronic device. The dynamic turning on and off of the functional units in accordance with the requirements of the program step(s) being executed causes a significant reduction in power (e.g., 10–30%) consumed by the functional units, which results in significant reduction in the heat dissipation requirements and a significant reduction in the power requirements of the microelectronic device. The present invention results in significant reduction in heat dissipation requirements and in power requirements for the microelectronic device, which means that heat sink requirements are reduced and battery discharge cycle length is extended, both of which are very desirable results. In addition, power bus line widths can be reduced. This leads to substantial area saving for VLSI chips.

Figure 1:
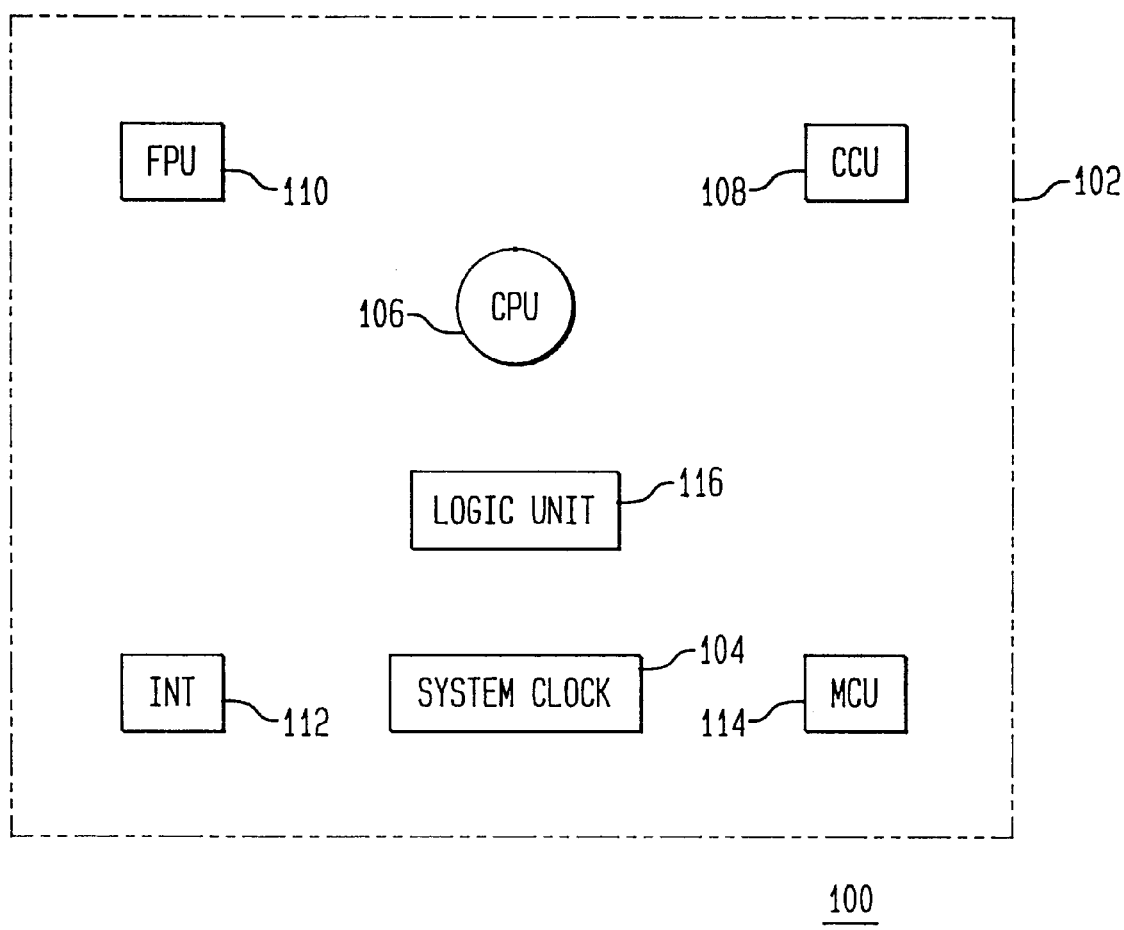
FIG. 1 is a high level block diagram of a floor plan showing representative functional units of a microelectronic device 100 fabricated on a single die 102 in accordance with the present invention.

FIG. 1 shows the floor plan of a representative microelectronic device in accordance with the present invention. As shown, the microelectronic device represented generally by a reference number 100 has a die 102 fabricated, for example, from silicon, having implemented on it the various functional units which make up the architecture of the electronic circuit that is fabricated on die 102. As shown, these functional units in the representative example include: a system clock 104, a central processing unit (CPU) 106, a cache control unit (CCU) 108, a floating point unit (FPU) 110, a integer unit (INI) 112, and a memory control unit (MCU) 114. It should be understood that the functional units that are shown in FIG. 1 are merely for purposes of illustration. The present invention contemplates any arrangement of functional units on die 102 of microelectronic device 100. For example, microelectronic device 100 could include memory as well as logic functional units. The present invention contemplates present and future computer architectures as implemented on a single semiconductor die or substrate.

As shown in FIG. 1, a logic unit 116 is part of microelectronic device 100. Logic unit 116, as discussed in greater detail below, operates with system clock 104 so as to determine when to turn on and off, and to actually turn on and off the supply of clock signals to the functional units in accordance with one embodiment of the present invention.

Figure 2:
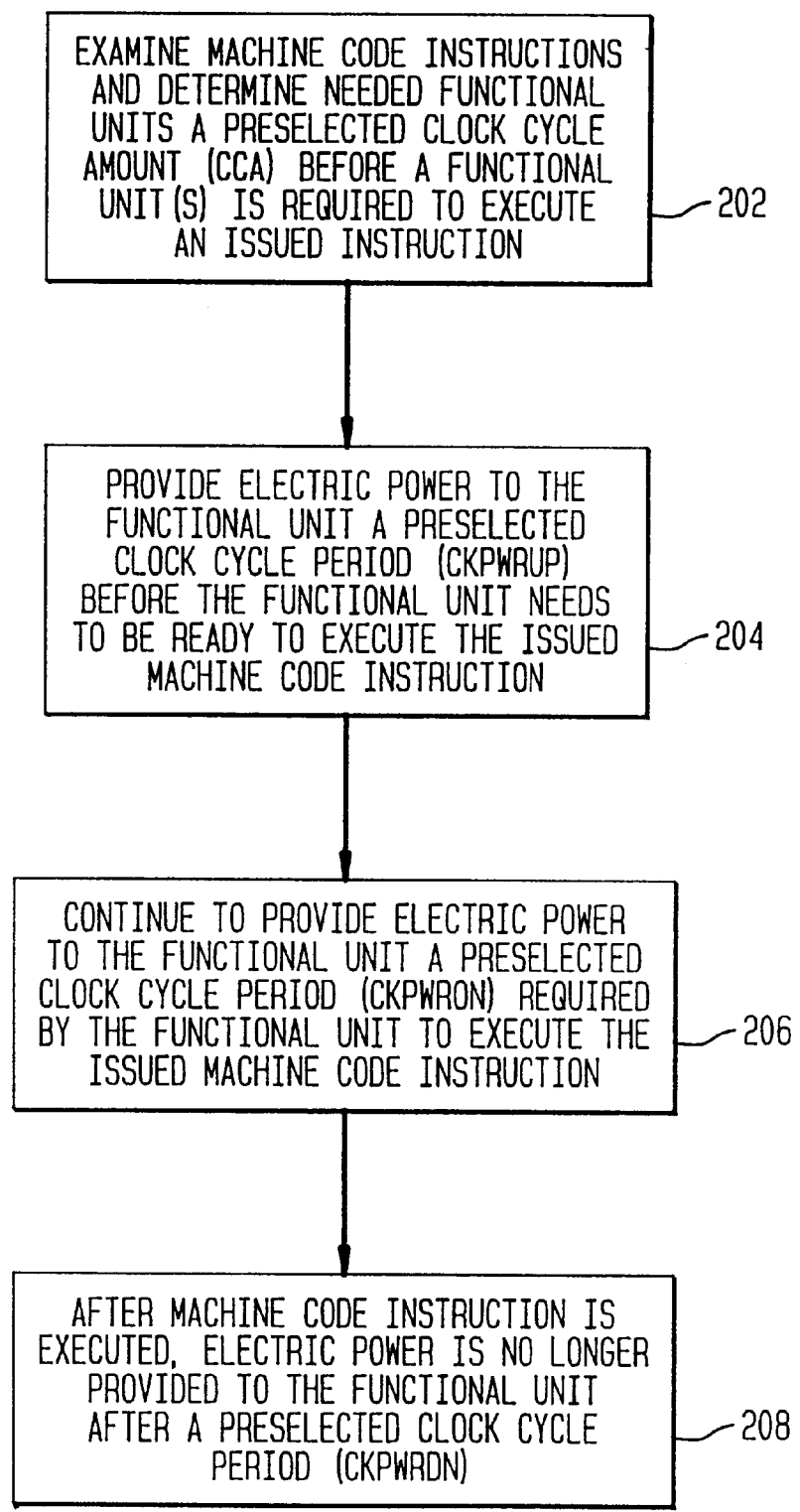
FIG. 2 is a high level flow chart showing the high level operational steps of the present invention.

FIG. 2 shows a high level flow chart which represents the high level operation of the system and method of the present invention. Referring now to FIG. 2, the present invention utilizes four basic operational steps.

First, the present invention decodes (or otherwise evaluates) the machine code instructions (compiled from the source code) of the computer program that is running on (controlling) microelectronic device 100. In this first step, the present invention monitors the machine code to determine what specific functional unit(s) will be needed to execute the next instruction issued for execution. A preselected clock cycle amount (called CCA only for convenience) before a functional unit(s) is needed to execute the next machine instruction to be issued, is used as the time frame that the present invention uses for looking at the next machine code instructions before it is issued to be executed. This CCA allows the present invention to take the appropriate logical steps to cause the functional unit(s) to be turned on in time so that the issued machine code instruction can be executed in sequence. This first step or block is indicated by a reference number 202.

In a step or block 204, the present invention removes switch-inhibiting control signals from the functional unit a preselected clock cycle period (called clock power up CKPWRUP only for convenience) before the functional unit needs to be ready to execute the issued machine code instruction. Switching ability is provided during CKPWRUP time frame so that the functional unit is fully operational when the machine code instruction in question is issued to the functional unit. Thus, it can be seen in this second step that the present invention activates the functional unit(s) in question sufficiently prior to when it is needed to execute the machine code instruction so that the functional unit(s) is fully operational when the execution needs to take place.

Any amount of clock cycles can be selected for the CKPWRUP. In a preferred embodiment of the present invention, a single half-clock cycle is used. In other words, the functional unit is activated within a single half-lock cycle before it is needed for execution of an issued machine code instruction. It thus can be appreciated that the functional unit remains off or in a "stand by" mode (which describes the "no" input condition causing no power consumption), until the very last moment before it is needed for executing the machine code instruction.

In a third step or block 206, the present invention continues to provide switching ability to the functional unit for a preselected clock cycle period (called clock power on CKPWRON only for convenience). CKPWRON is the time period (number of clock cycles) required by the functional unit to execute the issued machine code instruction. As such, it includes the clock cycles needed to receive the issued instruction, and the clock cycles equal to the latency period of the functional unit to complete the execution of the instruction.

The fourth and final step or block of the present invention is represented by a reference numeral 208. In this fourth step, switching ability is no longer provided to the functional unit after a preselected clock cycle period (called clock power down CKPWRDN) after the functional unit has completed the required task of executing the machine code instruction of the computer program. In other words, the functional unit is turned off (de-activated) after it has executed the required task. In this way, the functional unit is not kept on or active after it is no longer needed. A typical value for CKPWRDN is a single half-clock cycle. This activate/de-activate embodiment is appropriate for functional units requiring memory, state saving, or the like. Other techniques are well within the scope of the present invention.

Coupling/decoupling of a power supply bus is also envisioned. The addition of a power switch(es) connected between $V_{DD}$ and each functional unit, can be used to turn on and off the supply of power to the functional units by controlling the power switch (e.g., FET) using the above CKPWRON control signal, or the like. In this power-down case, some DC power will be consumed through the power switch, but with the functional unit(s) disconnected, overall conservation will result The net result of these four steps of the present invention is a significant reduction in the power consumed by microelectronic device 100. This reduction is due to the act that the functional units are not kept on when they are not needed. As will be explained in detail below, since CMOS technology is used, power is only consumed when a functional unit is changing state (i.e., switching). Since a functional unit is "off" when it is prevented from changing state, negligible power is consumed by that functional unit. This means that a functional unit that is off does not consume power, which results in the power consumption reduction.

Since power consumption is reduced, the heat dissipation requirements of die 102 and associated packaging (not shown) of microelectronic device 100 is reduced. In addition, when a battery source is used, it can be made smaller for a given operational period of time. Furthermore, because power consumption is reduced, the line width of power supply buses can also be reduced.

Figure 3:
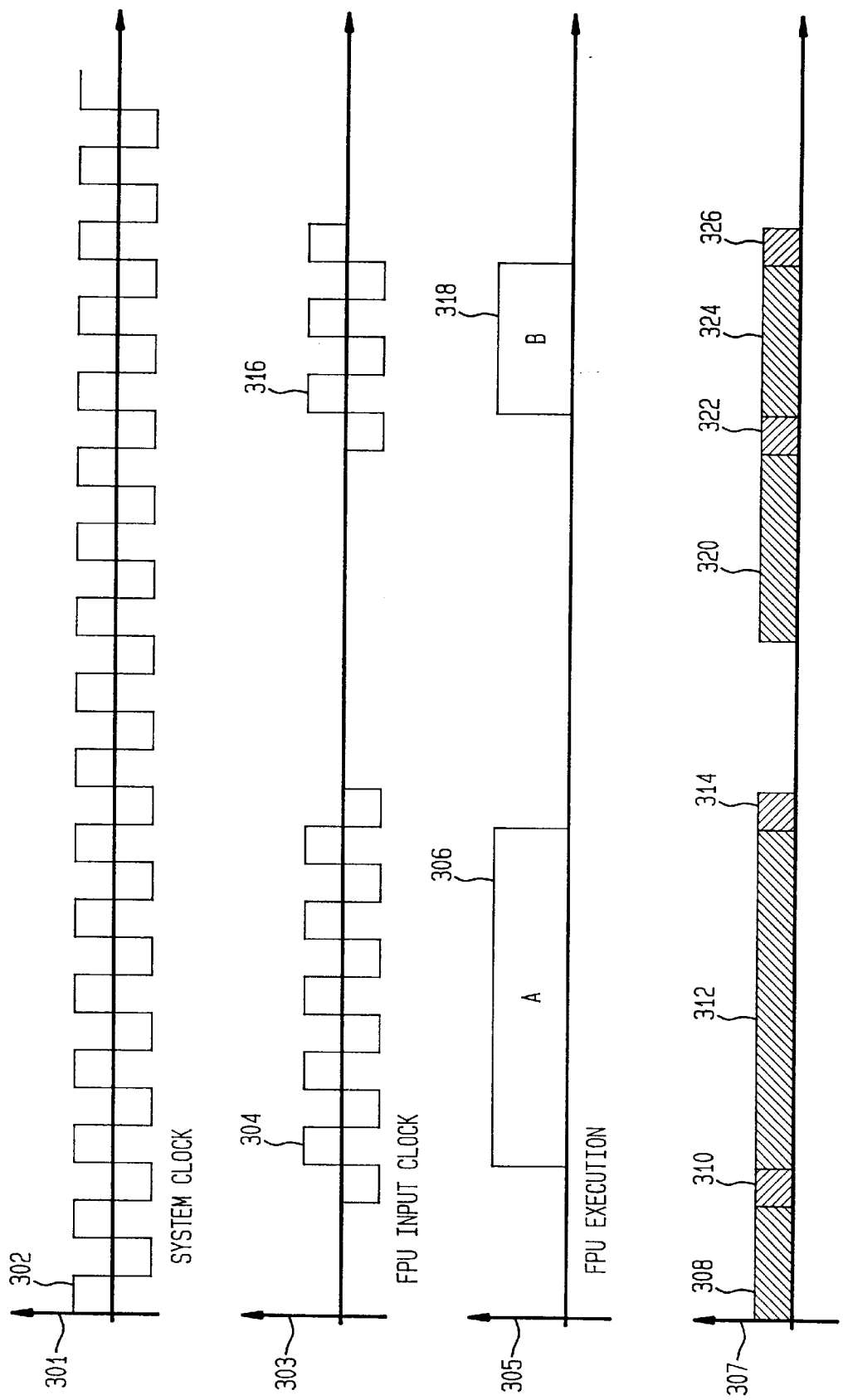
FIG. 3 is a plot of four traces showing a representative operation of a functional unit in accordance with the present invention.

A representative example of the operation of the present invention in accordance with the flow chart of FIG. 2 is now described with reference to FIG. 3. FIG. 3 shows four traces, each having the same timeframe on the horizontal axis. The vertical axis of each trace indicates the amplitude of a signal or the state of a functional unit, or the state of operation in accordance with the present invention, as described below. Upper trace 301 shows waveform 302 which is the output of system clock 104 (FIG. 1) that is the clock for all of the functional units which make up microelectronic device 100. The two system clocks are 180° out of phase from one another.

The representative functional unit for FIG. 3 that is chosen for this explanation is floating point unit (FPU) 110. As is discussed below in the example section, it turns out that FPU 110 in many computer systems is used about 10% of the time. Consequently, the present invention produces significant reduction in power dissipation requirements and power consumption as it relates to FPU 110, as will become more apparent.

Third trace 305 shows the execution of two floating point operations. The first floating point operation, labeled A, is indicated by a box 306. Box 306 represents the number of clock cycles required to perform floating point operation A. Similarly, floating point operation B as indicated by a box 318 is also illustrated and shows the number of clock cycles that are required to execute it. Specifically, 5½ clock cycles are required to perform the floating point operation A, and two clock cycles are required to perform the floating point operation B. It should be understood that these timeframes are merely for purposes of illustration. In fact, it may be in actual practice that the floating point operation will require scores of cycles to be performed. In addition, there may be thousands of cycles between each floating point operation. However, FIG. 3 is not large enough to represent this graphically. Thus, the spacing between the floating point operations A and B and the length of each have been made arbitrarily small for purposes of illustration.

Fourth trace 307 of FIG. 3 illustrates the four steps that take place with respect to each of the floating point operations A and B. With respect to floating point operation A, the CCA period is represented as requiring three half-cycles. This CCA period is indicated by reference numeral 308. A CKPWRUP period for floating point operation A is single half-clock cycle, and is indicated by a time block 310. The amount of time that floating point operation A takes corresponds to the CKPWRON period represented by a time block 312. Finally, a CKPWRDN period is a half-clock cycle, and is represented by a time block 314.

The actual operation of FPU 110 to execute floating point operation A is controlled in accordance with the present invention by providing system clock 302 to the clock input of FPU 110 for the time period of the clock cycles indicated by reference numeral 304 of trace 303. It is seen in trace 303 that the system clock provided at the FPU clock input is provided one-half clock cycle before the beginning of the execution of floating point operation A, and is left on for one-half clock cycle after the completion of floating point operation A.

A similar example is shown for floating point operation B. Referring again to trace 307, the CCA period is indicated by a time block 320, which for purposes of illustration is shown as requiring three half-cycles. A CKPWRUP time block 322 is one-half clock cycle. A CKPWRON time block 324 is two clock cycles, which corresponds to the time frame required by FPU 110 to complete the floating point operation B. Finally, a CKPWRDN time block 326 is a one-half clock cycle.

FIG. 3 illustrates the power saving that results in accordance with the operation of the present invention. Specifically, with reference to trace 303, it can be seen that the state of FPU 110 is allowed to change only when there is a clock signal applied to the FPU clock input. In other words, FPU 110 in the illustrated example is only operational during period 304 and during period 316, and is not operational during the intervening time periods. Thus, it can be seen where the power savings occur in accordance with the present invention.

It should be appreciated that all of the functional units in the microelectronic device 100 are being similarly controlled by the present invention so that only the functional unit(s) that is needed to execute the latest machine code instruction being issued is powered on. All other unneeded functional units are powered off. Thus, significant power savings result in accordance with the present invention.

The present invention has particular applicability to CMOS integrated circuitry. The reason for this is that CMOS circuits only consume power when they change state. In other words, power is only consumed when switching is occurring. Viewed from the transient or alternating current (AC) domain, the amount of power consumed to switch a node is proportional to $CV^2$, where C=the capacitance in farads for the switched node, and V is the voltage from rail $V_{SS}$ to rail $V_{DD}$. From the steady state or direct current (DC) perspective, the amount of power consumed is equal to 5–15%, depending on manufacturing process valiables and input slew rate.

CMOS should be compared to BiCMOS, where the power consumption of the bipolar circuit can not be turned off, due to "low" input resistance through the base of the device and current control mechanisms used. In contrast, CMOS (and MOS devices in general) have a high input impedance at the gate electrode due to the gate oxide's electrical isolation properties.

CMOS should also be compared to bipolar transistor circuitry as well. Bipolar transistors consume electrical power regardless of whether any switching is occurring. In other words, current is flowing in the circuit even when no switching is taking place. This is the reason why CMOS technology has become the technology of choice in integrated circuits, due to its low power consumption, scaling-down of power supplies (e.g., batteries for portable computers) is feasible.

The present invention is particularly applicable for CMOS circuitry. It is also applicable for BiCMOS, NMOS, MESFFT, $I^2L$ and GaAs circuitry as well.

The present invention contemplates any suitable approach for controlling whether the state of a functional unit is allowed to change. This control of state changes turns the functional unit on and off, and produces the desired power reduction in accordance with the present invention.

Figure 4:
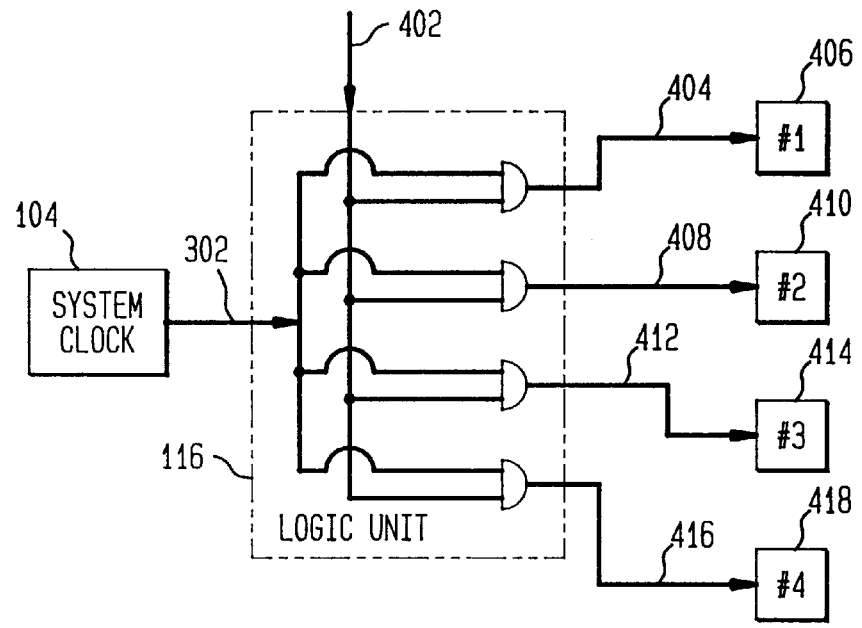
FIG. 4 is a block diagram of an embodiment of the present invention for turning on and off the functional units using the system clock signal with gated control signal.

Referring now to FIG. 4, one representative approach for controlling the state of a functional unit in accordance with the present invention is shown. This approach controls providing system clock signal 302 to the functional unit in question. The functional unit only consumes power when the present invention provides system clock signal 302. Referring now to FIG. 4, logical unit 116 of the present invention evaluates (by decoding for example) issuance of machine code instructions via a path 402 in accordance with any suitable approach, discussed below. Intelligence provided by path 402 allows logic unit 116 to know when to turn on and off various functional units in accordance with the present invention.

System clock 104 provides system clock signal 302 to logic unit 116. For purposes of illustration, four functional units are shown, labeled #1, #2, #3, and #4. Reference numeral 406 corresponds to functional unit 1, reference numeral 410 corresponds to functional unit 2, reference numeral 414 corresponds to functional unit 3, and reference numeral 418 corresponds to functional unit 4. Each functional unit 406, 410, 414 and 418 has a corresponding clock input line 404, 408, 412, and 416, respectively.

In operation, logic unit 116 provides system clock, signal 302 on the appropriate clock input line for the functional unit that is being turned on. When that functional unit is to be turned off, logical unit 116 no longer provides system clock 302. Since the functional unit cannot change state without provision of the clock signal, no power is consumed by functional units not receiving clock signal 302. This is how a functional unit is turned on or off by turning clock signal 302 on or off.

Figure 5:
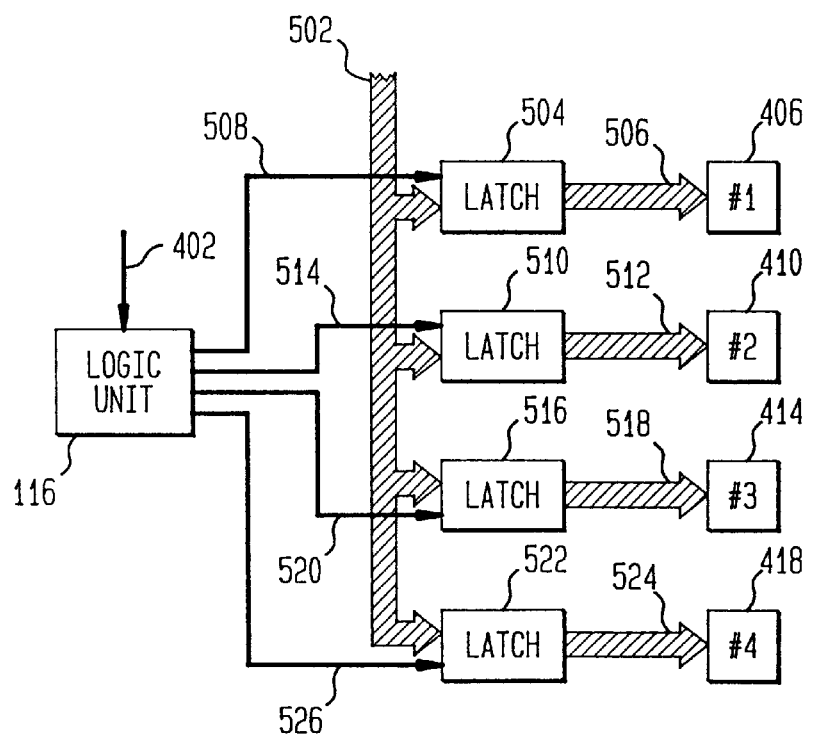
FIG. 5 is a block diagram of an embodiment of the present invention for turning on and off the functional units by controlling the state of the inputs to the functional units.

An alternate approach for turning on and off the functional units is shown in FIG. 5. Referring now to FIG. 5, this embodiment turns on and off functional units 406, 410, 414, and 418 by controlling the state change of the inputs for these functional units. By not allowing the inputs of functional units that are off to change state, this approach effectively turns off such functional units. Only the inputs of functional units that are on are allowed to change state.

FIG. 5 shows one embodiment for accomplishing this strategy. One technique to keep the inputs from switching is to latch and hold the previous input (shown at 502) using a known gated latch device (see latches 504, 510, 516 and 522, for example). Latches 504, 510, 516 and 522 are controlled to pass the latched inputs via control lines 508, 514, 520 and 526, which can be generated by logic unit 116 based on signal 402, as will become evident to those skilled in the art. Alternatively, the inputs can be forced to a high impedance value by logically ANDing the input with a control signal. Many other functionally equivalent techniques will become readily apparent to those of ordinary skill in the art.

Similar structure and operation applies to functional unit 410, functional unit 414, and functional unit 418. Therefore, separate discussion of them is not required.

The present invention contemplates other approaches for turning on and off functional units by the logic unit 116. The embodiments of FIGS. 4 and 5 are merely for purposes of illustration.

The present invention can utilize several approaches for obtaining the monitoring information on line 402 used by logic unit 116 to determine when to turn on and off each of the functional units during the execution of the machine code instructions.

Figure 6:
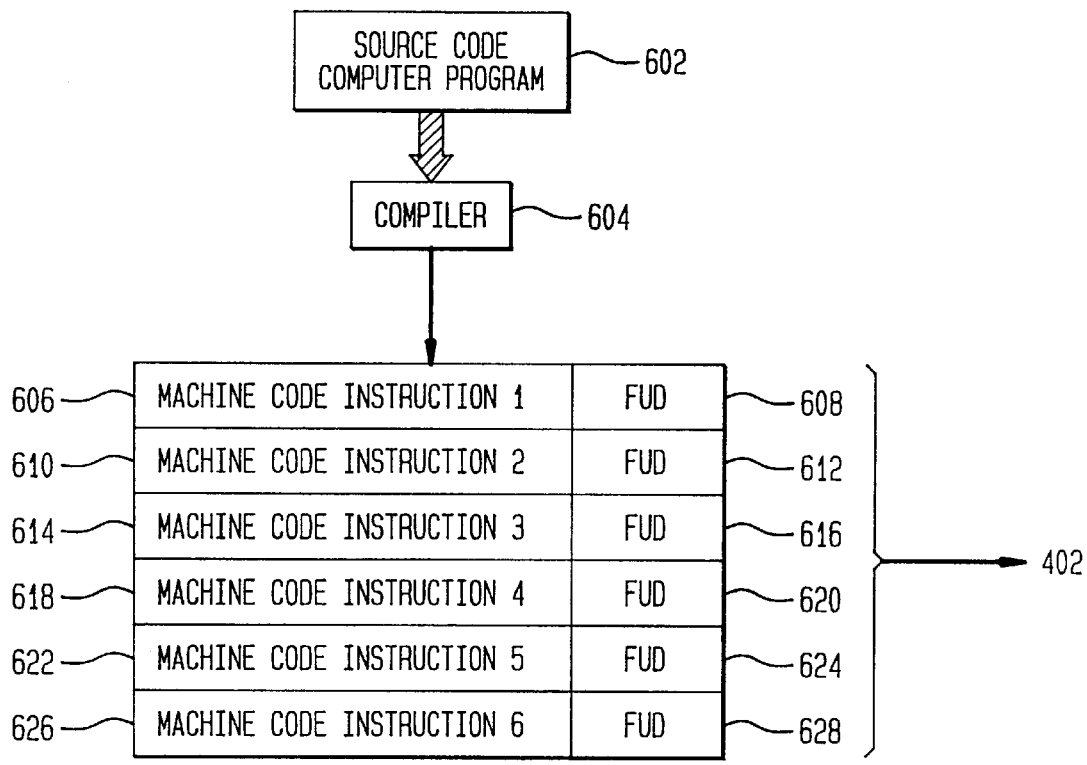
FIG. 6 is a block diagram of an embodiment of the present invention where the monitoring information 402 is developed by a compiler in conjunction with compiling each machine code instruction.

A representative approach is shown in FIG. 6. A computer program in source code form, designated by a reference numeral 602, is supplied to a compiler 604 for compiling source code 602 into machine code. Compiler 604 produces machine code instructions after compiling the source code. For purposes of illustration, six machine code instructions 606, 610, 614, 618, 622, and 626 are shown. Each machine code instruction has a corresponding functional unit data block, which comprises the monitoring information that is supplied by path 402 to logic unit 116. The functional unit data accompanying a given machine code instruction thus can allow logic unit 116 to operate microelectronic device 100 in accordance with the present invention.

Figure 7:
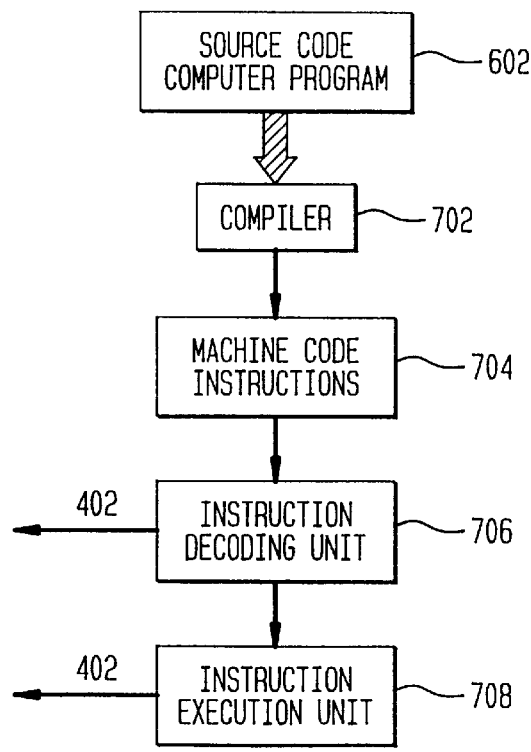
FIG. 7 is a block diagram of an embodiment of the present invention where the monitoring information 402 is developed by the instruction decoding unit and the instruction execution unit operating on the machine code instructions.

An alternate embodiment for providing monitoring information on line 402 is shown in FIG. 7. Here, the actual operation of a reduced instruction set computer (RISC) superscalar microprocessor, which is a typical application for the present invention, provides the monitoring information on line 402 as follows. Source code computer program 602 is supplied to a compiler 702, which produces machine code instructions 704. The machine code instructions are supplied first to an instruction decoding unit (IDU) 706. The decoded instructions from IDU 706 are supplied to an instruction execution unit (IEU) 708.

IDU 706 and IEU 708 in performing the out-of-order execution provides the decoded information 402 as indicated. This decoded information may take the form of data dependency information, instruction issuing information, or the like. The information is available from instruction scheduling logic. An example of instruction scheduling logic is found in commonly owned copending application titled, "Superscalar RISC Instruction Scheduling" application Ser. No. 08/219,425. (now U.S. Pat. No. 5,497,499) (Attorney Docket No. SP035/1397.0170000).

Figure 8:
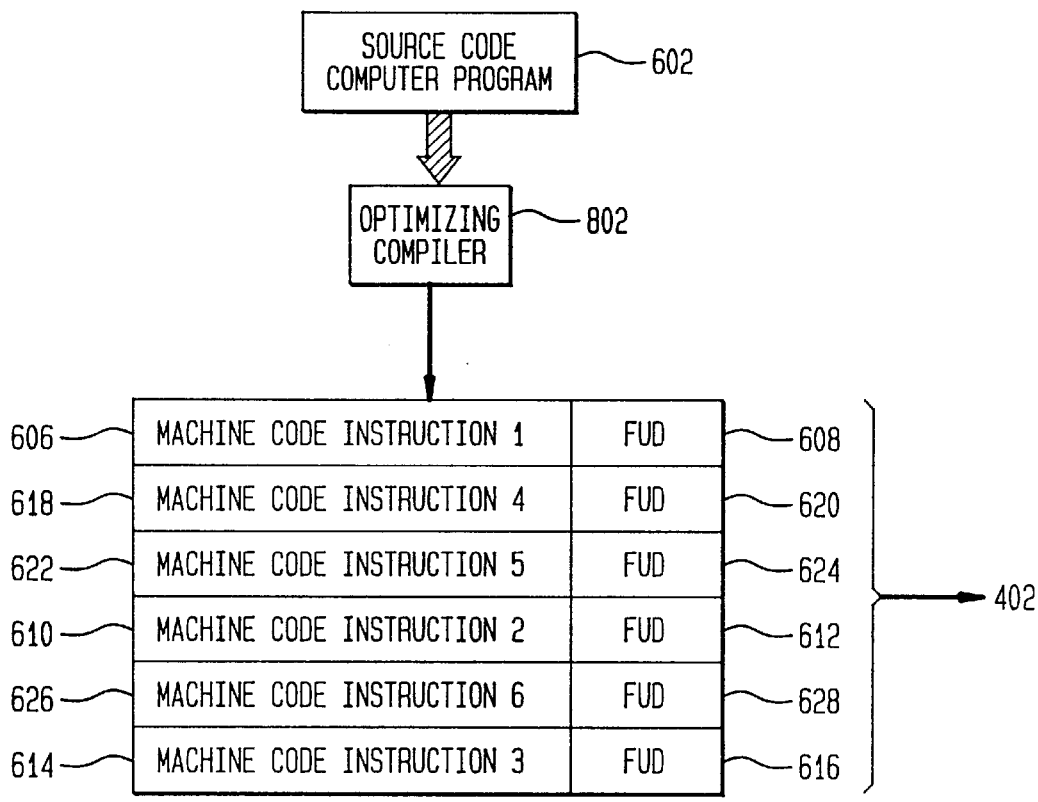
FIG. 8 is a block diagram of the embodiment of the present invention of an optimizing compiler used for reordering the machine code instructions so as to achieve maximum power saving in accordance with the present invention.

FIG. 8 shows an embodiment of the present invention using an optimizing compiler 802 to order the machine code instructions in a way which maximizes the power saving produced by the present invention. This power saving is achieved by reordering the machine code instructions from the order derived from the source code. The reordering is done so as to optimize the reduction in power consumption by microelectronic device 100 in connection with running computer program 602.

A representative block diagram showing such an optimization is in FIG. 8. As shown, optimizing compiler 802 produces output in the form of reordered machine code instructions. For purposes of illustration, the same machine code instructions with accompanying functional unit data found in FIG. 6 are used to show the reordering concept. It is seen that the machine code instructions with their associated FUD are reordered. This example is to illustrate that reordering can produce optimization in terms of power consumption reduction.

The reordered machine code instructions are then issued to the functional units, which are controlled by logic unit 116 in accordance with the operation described in connection with FIG. 6. When compiler 802 determines that one or more functional blocks are not used after instruction 1 for some number of cycles, it can send disable or power down signals to those one or more functional blocks in order to stop clocking, block inputs or shut off the power supply, as the case may be, until the one or more blocks are need in the future. For a 5W chip, Table 1 shows representative percentage of use and power savings. Note that the total power down savings represents 46% (2.3/5).

TABLE 1

| Functional Unit | Wattage Requirement | Percentage of Use | Power Down Savings |
| --- | --- | --- | --- |
| Floating Point | 1.5 | 10 | 1.35 |
| Integer | 1.0 | 90 | 0.10 |
| Memory | 2.0 | 75 | 0.50 |
| Graphics | 0.5 | 30 | 0.35 |
| | | TOTAL SAVINGS | 2.30W |

The "selective power down" techniques of the present invention may easily be applied to the highly structured functional units/modules disclosed in a commonly owned, co-pending application titled "Hardware Emulation Accelerator and Method", application Ser. No. 08/,352,680, (now U.S. Pat. No. 5,581,742), the disclosure of which is incorporated herein by reference.

Laptop Notebook and Palmtop Computer Optimization Strategy

As discussed above, the present invention produces significant savings in power consumption. This has very direct impact on laptop and palmtop computers, where weight is a very critical, if not the most critical, factor in terms of user acceptance. Even a reduction in 0.25 kg can be enough for a user to select that particular computer over a heavier version. Even though significant strides have been made in terms of battery technology resulting in significant weight reduction, any reduction in power consumption would be extremely important since it would produce much longer life of operation for a given battery and battery charge.

Figure 9:
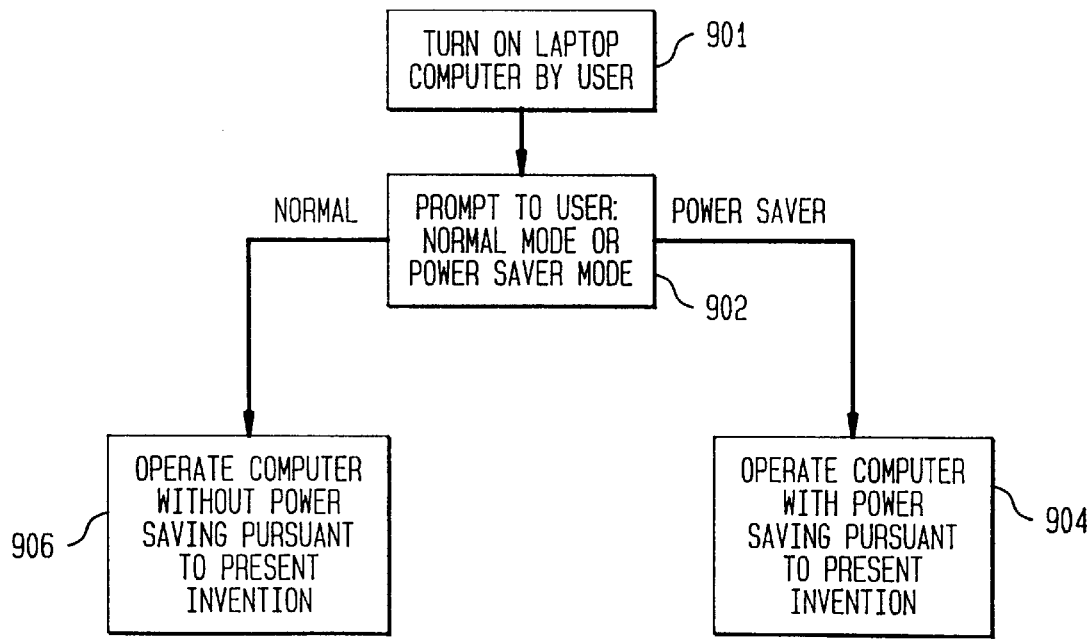
FIG. 9 shows a block diagram of a power optimization scheme as applied to a laptop or palmtop computer in accordance with the present invention.

FIG. 9 shows a block diagram of one strategy that can be used in accordance with the present invention. As shown the user can select a longer battery life option when operating the laptop or palmtop computer. This is indicated by 1002. Once this option is selected, the present invention utilizes an optimization scheme, as indicated by reference numeral 904, which acts to minimize the power consumption of the microelectronic device. This could come in many different forms such as reordering of machine code instructions or operating particular functional units separate and apart from each other.

This approach has particular applicability to situations where the laptop or palmtop computer is being used for an extended period of time away from a standard voltage source. In other words, the unit is being run entirely by battery. The user desires to maximize the operational time of the laptop or palmtop computer in such situation. This optimization approach allows this to be achieved.

While various embodiments of the present invention have been described above, it should be understood that they have been presented by way of example, and not limitation. Thus the breadth and scope of the present invention should not be limited by any of the above-described exemplary embodiments, but should be defined only in accordance with the following claims and their equivalents.

What is claimed is:

1. Method for reducing power consumption and heat dissipation of at least two functional units of a microelectronic device, the method comprising the steps of:

compiling, by an optimization compiler, a stream of source code instructions into a stream of machine code instructions, wherein each machine code instruction has a data block that indicates which of the at least two functional units is required for execution;

determining, by the optimization compiler, whether the stream of machine code instructions can be re-ordered to reduce the power consumption and heat dissipation of the at least two functional units;

re-ordering, by the optimization compiler, the stream of machine code instructions based on said determining step; and executing the re-ordered stream of machine code instructions such that a clock signal only gets supplied to the functional unit if required for execution of the current machine code instruction in the stream, and continuing to supply the clock signal to the functional unit only if the next machine code instruction in the stream requires it for execution.

2. The method of claim 1, wherein said executing step includes supplying the clock signal a preselected cycle time amount before execution.

3. A method for reducing power consumption and heat dissipation of at least two functional units of a microelectronic device, the method comprising the steps of:

compiling, by an optimization compiler, a stream of source code instructions into a stream of machine code instructions, wherein each machine code instruction has a data block that indicates which of the at least two functional units is required for execution;

determining, by the optimization compiler, whether the stream of machine code instructions can be re-ordered to reduce the power consumption and heat dissipation of the at least two functional units;

re-ordering, by the optimization compiler, the stream of machine code instructions based on said determining step; and executing the re-ordered stream of machine code instructions such that a power supply voltage only gets supplied to the functional unit if required for execution of the current machine code instruction in the stream, and continuing to supply the power supply voltage to the functional unit only if the next machine code instruction in the stream requires it for execution.

4. The method of claim 3, wherein said executing step includes supplying the power a preselected cycle time amount before execution.

5. A system for prolonging the life of a battery operating within a laptop computer system when a user selects a battery power saving mode of operation, the system comprising:

an optimization compiler that compiles a stream of source code instructions into a stream of machine code instructions, wherein each machine code instruction has a data block that indicates which of the at least two functional units is required for execution, and wherein said optimization compiler re-orders the stream of machine code instructions in such a way as to reduce the power consumption of the laptop computer system; and a logic unit that executes the re-ordered stream of machine code instructions such that a clock signal only gets supplied to the functional unit if required for execution of the current machine code instruction in the stream, and continuing to supply the clock signal to the functional unit only if the next machine code instruction in the stream requires it for execution.

6. The system of claim 5, wherein said logic unit supplies the clock signal a preselected cycle time amount before execution.

7. A system for prolonging the life of a battery operating within a laptop computer system when a user selects a battery power saving mode of operation the system comprising:

an optimization compiler that compiles a stream of source code instructions into a stream of machine code instructions, wherein each machine code instruction has a data block that indicates which of the at least two functional units is required for execution, and wherein said optimization compiler re-orders the stream of machine code instructions in such a way as to reduce the power consumption of the laptop computer system; and a logic unit that executes the re-ordered stream of machine code instructions such that a power supply voltage only gets supplied to the functional unit if required for execution of the current machine code instruction in the stream, and continuing to supply the power supply voltage to the functional unit only if the next machine code instruction in the stream requires it for execution.

8. The system of claim 7, wherein said logic unit supplies the power supply voltage a preselected cycle time amount before execution.

* * * * *